US009629300B2

(12) United States Patent
Zemenchik et al.

(10) Patent No.: US 9,629,300 B2
(45) Date of Patent: Apr. 25, 2017

(54) TURNBUCKLE ADJUSTMENT FOR TILLAGE IMPLEMENT TRACKING

(71) Applicant: CNH Industrial America LLC, New Holland, PA (US)

(72) Inventors: Robert A. Zemenchik, Kenosha, WI (US); Matthew R. Sudbrink, Metamora, IL (US); Dean A. Knobloch, Tucson, AZ (US)

(73) Assignee: CNH Industrial America LLC, New Holland, PA (US)

( * ) Notice: Subject to any disclaimer, the term of this patent is extended or adjusted under 35 U.S.C. 154(b) by 201 days.

(21) Appl. No.: 14/549,007

(22) Filed: Nov. 20, 2014

(65) Prior Publication Data

US 2015/0156944 A1 Jun. 11, 2015

Related U.S. Application Data

(60) Provisional application No. 61/914,594, filed on Dec. 11, 2013.

(51) Int. Cl.
*A01B 73/02* (2006.01)
*A01B 73/06* (2006.01)
(Continued)

(52) U.S. Cl.
CPC ............ *A01B 73/02* (2013.01); *A01B 59/002* (2013.01); *A01B 73/044* (2013.01); *A01B 73/048* (2013.01); *A01B 73/065* (2013.01)

(58) Field of Classification Search
CPC ..... A01B 73/02; A01B 73/044; A01B 73/048; A01B 73/065; A01B 73/06; A01B 59/002
See application file for complete search history.

(56) References Cited

U.S. PATENT DOCUMENTS 1,088,788 A * 3/1914 Mason ................ A01B 73/044
                                                     172/626
1,212,957 A * 1/1917 Jones .................. A01B 73/044
                                                     172/626

(Continued)

FOREIGN PATENT DOCUMENTS

| GB | 1 269 041 | 3/1972 | |
|---|---|---|---|
| GB | 1 500 179 | 2/1978 | |
| GB | 2135562 A * | 9/1984 | ............. A01B 15/14 |

OTHER PUBLICATIONS

Levelling, Stabilizer Arms, Draw Bar, Eyed End, Turn Buckle, Eastman Industries Limited taken from http://www.eastmanfarmparts.com/levelling-stabilizer-arms-draw-bar1.html, May 6, 2013 (1 page).

*Primary Examiner* — Matthew D Troutman
(74) *Attorney, Agent, or Firm* — Rebecca L. Henkel; Richard K. DeMille

(57) ABSTRACT

A tracking adjustment arrangement for an agricultural tillage implement includes a main frame section, a pull hitch coupled with and extending forward from the main frame section, and a pair of wing sections respectively pivotally coupled with opposite lateral sides of the main frame section. The tracking adjustment arrangement includes a pair of draft members and a pair of turnbuckles. Each draft member is configured for coupling between the pull hitch and a respective one of the wing sections. Each turnbuckle is coupled with an end of a respective draft member.

8 Claims, 5 Drawing Sheets

(51) Int. Cl.
*A01B 59/00* (2006.01)
*A01B 73/04* (2006.01)

(56) References Cited

U.S. PATENT DOCUMENTS

| | | | |
|---|---|---|---|
| 2,713,296 A | 7/1955 | Silver et al. | |
| 2,723,129 A * | 11/1955 | Sprague | A01B 31/00 172/239 |
| 2,755,722 A | 7/1956 | Fraga | |
| 3,139,942 A * | 7/1964 | Birkenbach | A01B 23/043 172/390 |
| 3,516,501 A * | 6/1970 | Sweet | A01B 21/08 172/314 |
| 4,211,287 A * | 7/1980 | Garrison | A01B 73/067 172/311 |
| 4,265,464 A | 5/1981 | Lange | |
| 4,492,272 A | 1/1985 | Jensen | |
| 4,564,073 A | 1/1986 | Ide et al. | |
| 4,703,810 A | 11/1987 | Meiners | |
| 4,778,194 A | 10/1988 | Koch et al. | |
| 5,462,123 A | 10/1995 | Harlan et al. | |
| 5,839,516 A | 11/1998 | Arnold et al. | |
| 6,443,474 B1 | 9/2002 | Kay | |
| 6,550,543 B1 | 4/2003 | Friggstad | |
| 6,557,646 B1 | 5/2003 | Hurtis et al. | |
| 6,609,575 B1 | 8/2003 | Crabb | |
| 6,612,381 B2 | 9/2003 | Powell et al. | |
| 6,681,868 B2 | 1/2004 | Kovach et al. | |
| 6,708,775 B2 | 3/2004 | Beaujot | |
| 7,048,071 B1 | 5/2006 | Huenink et al. | |
| 8,020,629 B1 | 9/2011 | McFarlane et al. | |
| 8,047,299 B2 | 11/2011 | Hurtis et al. | |
| 8,235,133 B2 | 8/2012 | Friggstad | |
| 8,235,410 B2 | 8/2012 | Weber et al. | |
| 8,336,639 B2 | 12/2012 | Palen | |
| 2003/0150626 A1 | 8/2003 | Domries | |
| 2005/0028992 A1* | 2/2005 | Potter | A01B 59/068 172/439 |
| 2013/0068489 A1 | 3/2013 | Blunier et al. | |

* cited by examiner

TURNBUCKLE ADJUSTMENT FOR TILLAGE IMPLEMENT TRACKING

CROSS REFERENCE TO RELATED APPLICATIONS

This is a non-provisional application based upon U.S. provisional patent application Ser. No. 61/914,594, entitled "TURNBUCKLE ADJUSTMENT FOR TILLAGE IMPLEMENT TRACKING", filed Dec. 11, 2013, which is incorporated herein by reference.

BACKGROUND OF THE INVENTION

1. Field of the Invention

The present invention relates to agricultural tillage implements, and, more particularly, to agricultural field cultivators.

2. Description of the Related Art

Farmers utilize a wide variety of tillage implements to prepare soil for planting. Some such implements include two or more sections coupled together to perform multiple functions as they are pulled through fields by a tractor. For example, a field cultivator is capable of simultaneously tilling soil and leveling the tilled soil in preparation for planting. A field cultivator has a frame that carries a number of cultivator shanks with shovels at their lower ends for tilling the soil. The field cultivator converts compacted soil into a level seedbed with a consistent depth for providing excellent conditions for planting of a crop. Grass or residual crop material disposed on top of the soil is also worked into the seedbed so that it does not interfere with a seeding implement subsequently passing through the seedbed.

A field cultivator as described above may also include an optional rear auxiliary implement for finishing the seedbed for seeding. For example, a rear auxiliary implement may include a spike tooth harrow, spring tooth harrow, rolling (aka. crumbler) basket, cultivator shanks etc., or any combination thereof.

As tillage implements become wider and wider over time, it becomes more difficult to keep the transport size of the implement within manageable limits. It also becomes more difficult to convert the tillage implement from an operating mode to a transport mode, or vice versa, without requiring too much time and difficulty on the part of the operator. It is desirable for the tillage implement to be converted from one mode to the other while the operator remains within the operator cab, through the use of hydraulics or other actuators.

With wide field cultivators as described above, it is known to have a main frame section and one or more wing sections which are foldable relative to each other such that the wing sections can be folded to a compact transport mode. Such wide field cultivators typically fold the wing sections up and over the main frame section (known as a top fold). As the size of field cultivators increase, it is important for the cultivator to track properly behind the traction unit both when in the field mode and the transport mode. Tracking of the cultivator refers to the transverse angle of the frame sections relative to the longitudinal direction of the pull hitch, or travel direction of the cultivator. If the tillage implements (e.g., cultivator shovels) are in a working position in the ground, any angular offset of the cultivator caused by improper tracking can be further exacerbated by the difference in force angles/vectors exerted on the tillage implements by the ground.

What is needed in the art is a tillage implement which properly tracks behind the traction unit.

SUMMARY OF THE INVENTION

The present invention provides a tillage implement with draft members incorporating a manual turnbuckle adjustment allowing the wing sections to properly track relative to the travel direction of the implement.

The invention in one form is directed to an agricultural tillage implement, including a main frame section and a pull hitch coupled with and extending forward from the main frame section relative to a travel direction. A plurality of wing sections, including at least one left wing section and at least one right wing section, are pivotally coupled with a respective lateral side of the main frame section so as to pivot in fore and aft directions relative to the travel direction. A pair of draft members are each coupled between a respective wing section and the pull hitch or the main frame section. A pair of turnbuckles are each coupled with an end of a respective draft member.

The invention in another form is directed to a tracking adjustment arrangement for an agricultural tillage implement including a main frame section, a pull hitch coupled with and extending forward from the main frame section, and a pair of wing sections respectively pivotally coupled with opposite lateral sides of the main frame section. The tracking adjustment arrangement includes a pair of draft members and a pair of turnbuckles. Each draft member is configured for coupling between the pull hitch and a respective one of the wing sections. Each turnbuckle is coupled with an end of a respective draft member.

The invention in yet another form is directed to a method of adjusting the tracking of a multi-section field cultivator. The field cultivator includes a main frame section having a pull hitch tube extending in a travel direction and a pair of wing sections pivotally coupled with respective opposite sides of the main frame section. The method includes the steps of:

providing a tracking adjustment arrangement between the pull hitch and each of the wing sections, including a pair of draft members and a pair of turnbuckles, with each draft member being coupled between the pull hitch and a respective one of the wing sections, and each turnbuckle being coupled with an end of a respective draft member; and manually adjusting at least one of the turnbuckles to adjust the tracking of a corresponding wing section relative to the travel direction.

An advantage of the present invention is that the tracking of the tillage implement can be easily and simply adjusted.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates embodiment of the invention, in one form, and such exemplification is not to be construed as limiting the scope of the invention in any manner.

DETAILED DESCRIPTION OF THE INVENTION

Figure 1:
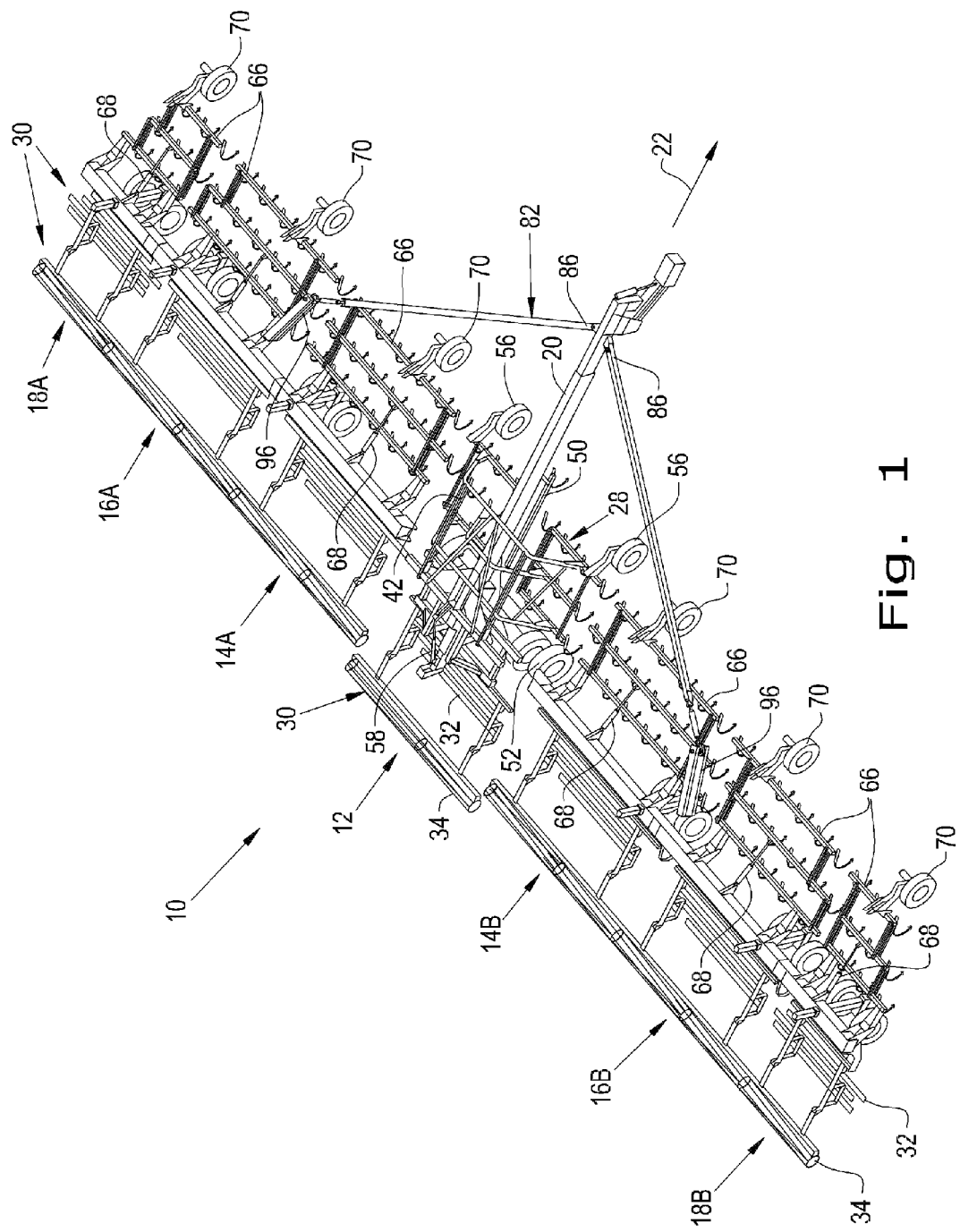
FIG. 1 is a top perspective view of an embodiment of an agricultural tillage implement of the present invention, in the form of a field cultivator.

Referring now to the drawings, and more particularly to FIG. 1, there is shown an embodiment of a tillage implement of the present invention. In the illustrated embodiment, the tillage implement is in the form of a field cultivator 10 for tilling and finishing soil prior to seeding. The tillage implement can also be differently configured.

Field cultivator 10 is configured as a multi-section field cultivator, and includes a main frame section 12 and a plurality of wing sections 14, 16 and 18. The three left wings sections are designated 14A, 16A and 18A, and the three right wing sections are designated 14B, 16B and 18B. Wing sections 14A and 14B are each inner wing sections, wing sections 16A and 16B are each middle wing sections, and wing sections 18A and 18B are each outer wing sections.

Figure 2:
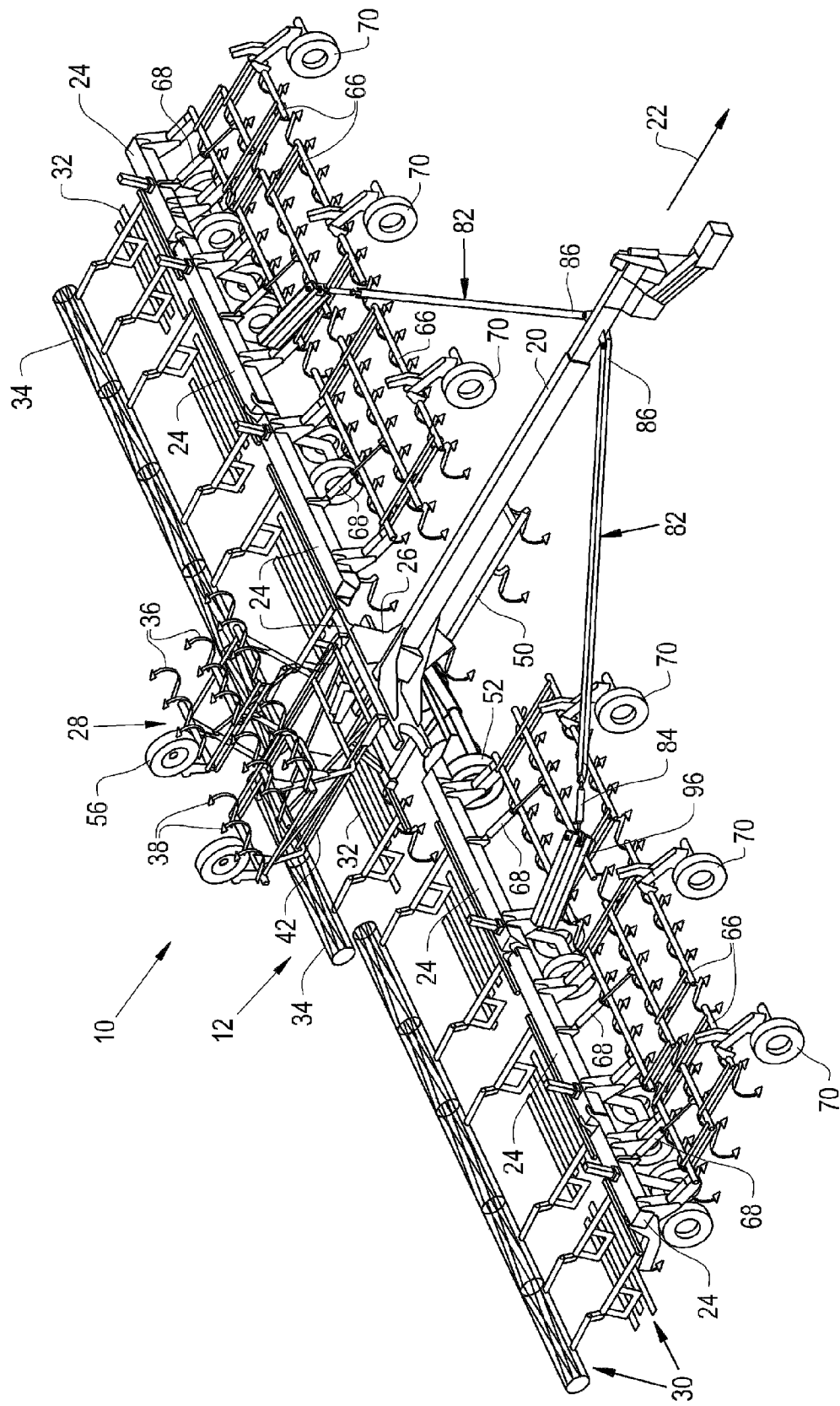
FIG. 2 is the same top perspective view shown in FIG. 1, with the center shank frame folded to a transport position.
Figure 3:
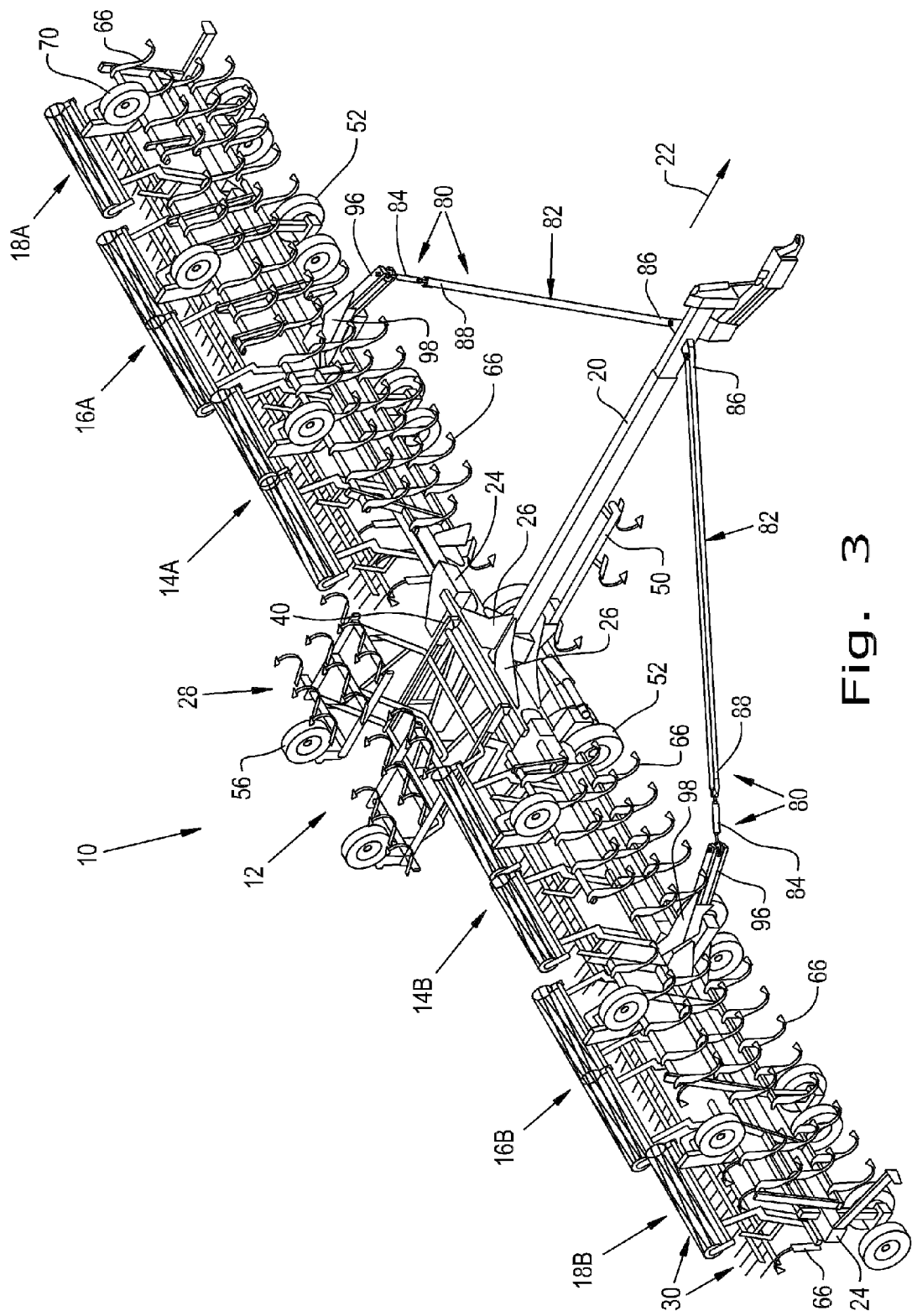
FIG. 3 is a top perspective view of the tillage implement shown in FIGS. 1 and 2, with the center shank frame folded rearward to a transport position and the wing section shank frames folded upwards to a transport position.

Main frame section 12 (FIGS. 1-4) is the center section that is directly towed by a traction unit, such as an agricultural tractor (not shown). Main frame section 12 includes a pull hitch tube 20 extending in a travel direction 22, and a tool bar 24 which is coupled with and extends transverse to pull hitch tube 20 (FIGS. 2 and 3). Reinforcing gusset plates 26 may be used to strengthen the connection between pull hitch tube 20 and tool bar 24. Main frame section 12 generally functions to carry a shank frame 28 for tilling the soil, and a rear auxiliary implement 30 for finishing the soil. Rear auxiliary implement 30 includes a spring tooth drag 32 and a rolling basket 34 (sometimes also referred to as a crumbler basket or advanced conditioning system) which coact with each other to finish the soil. However, the rear auxiliary implement can be differently configured, such as a spike tooth drag, cultivator shanks, etc.

Figure 4:
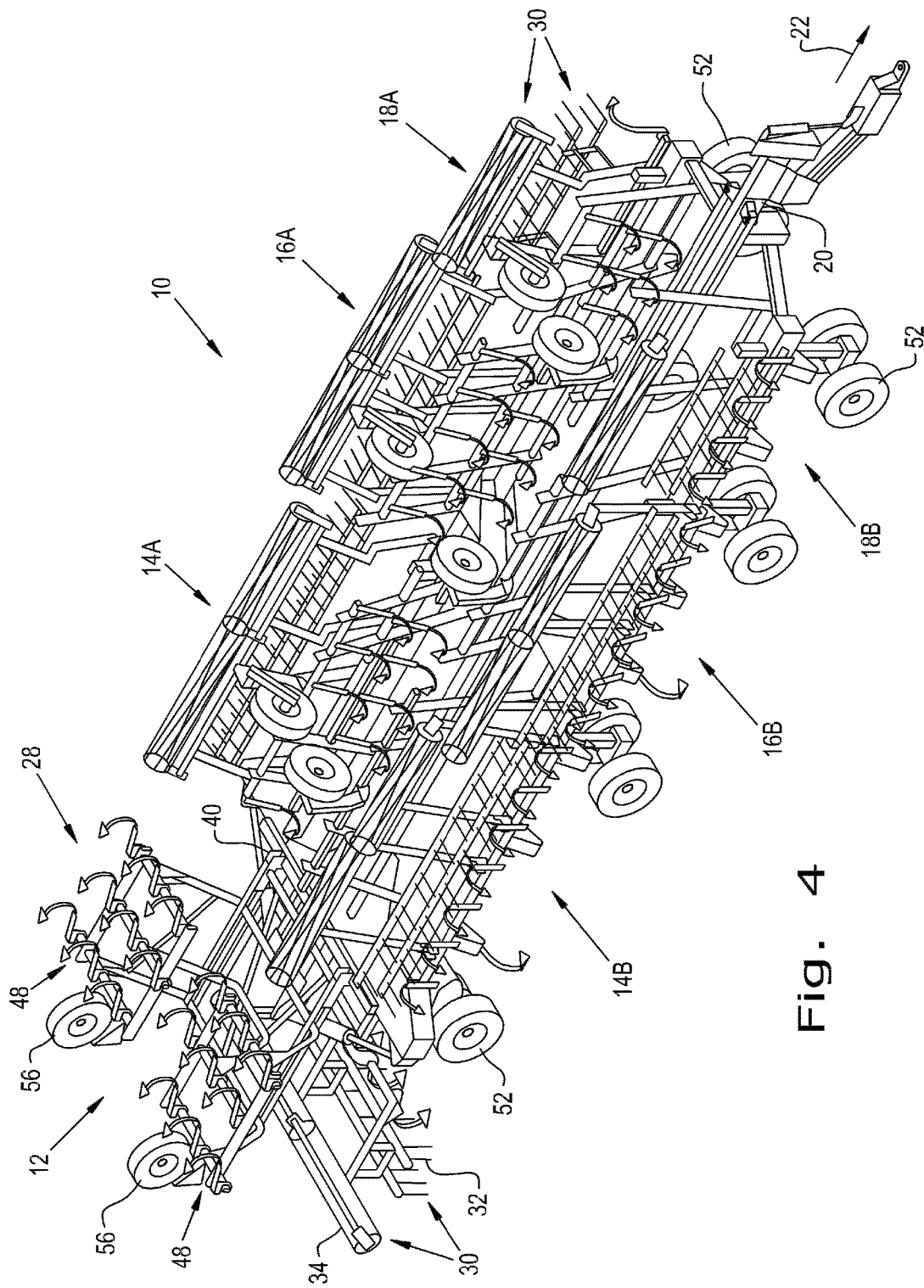
FIG. 4 is a top perspective view of the tillage implement shown in FIGS. 1-3, with the wing sections folded forward to a transport position.

Shank frame 28 generally functions to carry cultivator shanks 36 with shovels 38 at their lower ends for tilling the soil. Shank frame 28 is pivotally coupled with tool bar 24, for example at the top of tool bar 24, such as with couplings 40. Shank frame 28 is positioned in front of the tool bar 24 when in an operating position (FIG. 1), and is foldable up and over the tool bar 24 to a position rearward of tool bar 24 when in a transport position (FIGS. 2-4). Shank frame 28 includes a pair of respective shank sub-frames 48. Shank sub-frames 48 are spaced apart from each other in a direction transverse to pull hitch tube 20 and are positioned on respective opposite lateral sides of pull hitch tube 20 when in an operating position.

A center shank sub-frame 50 is attached to and positioned below pull hitch tube 20. Since shank sub-frames 48 are spaced apart on either side of pull hitch tube 20, center shank sub-frame 50 functions to till the soil in the intermediate open space between the two shank sub-frames 48. Center shank sub-frame 50 includes a number of cultivator shanks and corresponding shovels; three in the illustrated embodiment. Center shank sub-frame 50 is raised up and down with the raising and lowering of rear lift wheels 52 using a hydraulic cylinder (not shown).

Shank frame 28 also includes one or more gauge wheel assemblies 56 which function to level shank sub-frames 48. In the illustrated embodiment, shank frame 28 includes two gauge wheel assemblies 56 which are respectively coupled with a front of a respective shank sub-frame 48. A hydraulic cylinder 58 is used to fold shank frame 28 from the operating position to the transport position, and vice versa. Hydraulic cylinder 58 may optionally be placed in a "float mode" such that gauge wheel assemblies 56 are operable to float up and down as they traverse across a field and thereby set the operating depth at the front edge of shank frame 28.

Each wing section 14, 16 and 18 includes a tool bar 24, with all of the toolbars 24 being coupled together in a series arrangement across the width of tillage implement 10. Each tool bar 24 of a wing section 14, 16 and 18 carries a respective shank frame 66 and rear auxiliary implement 30. Hydraulic cylinders 68 interconnect between a respective toolbar 24 and shank frame 66, and are used to raise and lower shank frames 66.

According to an aspect of the present invention, tillage implement 10 includes a tracking adjustment arrangement 80 which allows simple and easy tracking adjustment of tillage implement 10 for a working or field mode of operation. Tracking adjustment arrangement 80 includes a pair of draft members 82 and a pair of turnbuckles 84. Draft members 82 are configured for coupling between the pull hitch tube 20 and a respective wing section 14, 16 or 18. In the embodiment shown, each draft member 82 is in the form of a draft tube that has a forward end 86 which is pivotally connected with pull hitch tube 20 and a rear end 88 which is pivotally connected with a respective turnbuckle 84.

Turnbuckle 84 is a manually adjustable linkage that has various applications with different types of agricultural equipment. An example of a turnbuckle application is a top link which acts as the upper link in a 3-point hitch at the rear of a tractor. Another application of a turnbuckle is for an adjustable link between the main frame and gang frame of a gang disk for the purpose of adjusting the angle of the gang disk.

Figure 5:
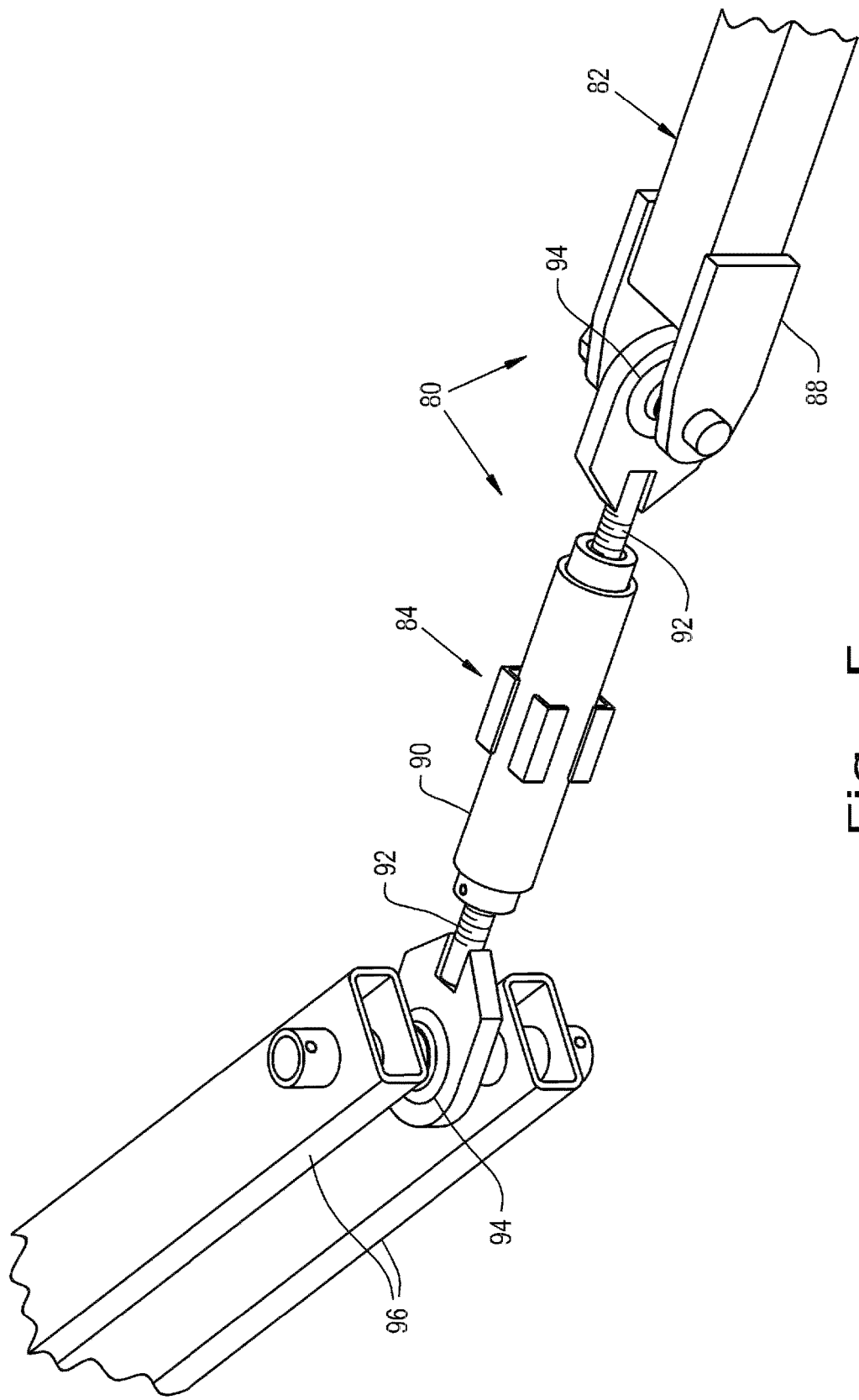
FIG. 5 is a fragmentary perspective view of an embodiment of the turnbuckle used as part of a tracking adjustment arrangement of the present invention, used with the tillage implement shown in FIGS. 1-4.

In general, turnbuckle 84 has an internally threaded actuator 90 and two externally threaded rods 92 that extend from each end of actuator 90 (FIG. 5). The outboard ends of each threaded rod 92 may include a ball coupling 94, with one ball coupling 94 being pivotally connected with the rear end 88 of draft tube 82 and the other ball coupling 94 being pivotally connected with a forward end of a respective swing arm 96. The ball couplings 94 may be positioned 90° relative to each other, such that the ball coupling 94 that is attached to swing arm 96 is arranged to allow horizontal movement of turnbuckle 84 relative to swing arm 96, and the ball coupling 94 that is attached to draft tube 82 is arranged to allow vertical movement of turnbuckle 84 relative to draft tube 82 (see FIG. 5). In this manner, turnbuckle 84 acts similar to a universal joint arrangement allowing movement in multiple directions as the field cultivator 10 traverses across uneven ground. Each swing arm 96 has a rear end which is pivotally connected with a stand-off bracket 98 which is rigidly affixed to and extends forward from toolbar 24 of a respective middle wing section 16.

It is to be understood that turnbuckle 84 need not include a ball coupling at the outboard end of threaded rods 92. For example, the outboard ends of threaded rods 92 can also be formed with a simple hole or a bushing allowing interconnection using an appropriate pin or the like.

During use, it is periodically necessary to move the field cultivator 10 from an unfolded (operating) position to a folded (transport) position. Hydraulic cylinder 54 is first actuated to lift the rear lift wheels 52 to the raised transport position. Hydraulic cylinder 58 is then actuated to fold shank frame 28 up and over tool bar 24 to an inverted position rearward of tool bar 24 (FIGS. 2 and 3). Then the shank frames 66 of the wing sections 14, 16 and 18 are folded upwards to a position at or near vertical using hydraulic cylinders 68 (FIG. 3). Diagonally angled draft arms 82 extending between a forward end of pull hitch tube 20 and a respective tool bar 24 associated with the pair of middle wing sections 16A and 16B are then folded inward, and wing sections 14, 16 and 18 are then folded forward to a position adjacent pull hitch tube 20 (FIG. 4). For unfolding the field cultivator 10 to the working or field position, the reverse folding sequence is carried out. When in the field position, the draft angle of wing sections 14, 16 and 18 relative to pull hitch tube 20 may need to be adjusted so that field cultivator 10 tracks properly during a working operation. To this end, one or both of the turnbuckles 84 can be adjusted to extend or retract the threaded rods 92 from the actuator 90, thereby in turn adjusting the draft angle of the wings sections 14, 16 and 18 on one or both sides of main frame section 12.

In the illustrated embodiment, each tracking adjustment arrangement 80 interconnects between pull hitch tube 20 and a respective middle wing section 16. It is also possible for each tracking adjustment arrangement to interconnect between different attachment locations on field cultivator 10. For example, if the main frame section does not fold up and out of the way for road transport, as shown in the illustrated embodiment, then the forward ends of the draft tubes can connect to the main frame section instead of the pull hitch. Likewise, the rear end of the tracking adjustment arrangement 80 can be connected with a respective inner wing section or outer wing section, rather than the middle wing section. Moreover, the turnbuckles can be positioned at the forward end of the draft tubes rather than the rear ends of the draft tubes.

Additionally, in the illustrated embodiment, turnbuckles 84 are manually adjusted by manually rotating actuator 90 to extend or retract the threaded rods 92. It is also to be understood that it may be possible to remotely adjust the turnbuckles 84 by providing a rotatable drive or the like which mechanically rotates actuator 90. For example, actuator 90 could include an external gear and a motor with a corresponding mating gear could be used to drive actuator 90 in a selected rotational direction.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural tillage implement, comprising:
a main frame section;
a pull hitch coupled with and extending forward from said main frame section relative to a travel direction;
a plurality of wing sections, including at least one left wing section and at least one right wing section which are pivotally coupled with a respective lateral side of said main frame section so as to pivot in fore and aft directions relative to the travel direction;
a pair of draft members, each said draft member being coupled between a respective said wing section and one of said pull hitch or said main frame section;
a pair of turnbuckles, each said turnbuckle being coupled with an end of a respective said draft member, wherein each said turnbuckle interconnects between a rear end of a respective said draft member and a respective said wing section, and wherein at least one left wing section includes an inner wing section, a middle wing section and an outer wing section positioned adjacent to one side of said main frame section, and said at least one right wing section includes an inner wing section, a middle wing section and an outer wing section positioned adjacent to an opposite side of said main frame section, and each said turnbuckle is coupled with a respective said middle wing section; and
a pair of swing arms, each said swing arm having one end which is pivotally connected with a respective said middle wing section, and an opposite end which is pivotally connected with a respective said turnbuckle.

2. The agricultural tillage implement of claim 1, wherein each said turnbuckle is pivotally connected with each respective said draft member and said wing section.

3. The agricultural tillage implement of claim 2, wherein each said turnbuckle has a ball coupling at each end, one of said ball couplings being arranged to allow horizontal movement and an other of said ball couplings being arranged to allow vertical movement.

4. The agricultural tillage implement of claim 1, wherein each said middle wing section includes a stand-off bracket extending in a forward direction, and each said swing arm is pivotally connected with a respective said stand-off bracket.

5. The agricultural tillage implement of claim 1, wherein each said draft member is coupled with said pull hitch.

6. The agricultural tillage implement of claim 5, wherein said pull hitch includes a pull hitch tube, and each said draft member has a forward end which is connected with said pull hitch tube.

7. The agricultural tillage implement of claim 6, wherein said main frame section includes a tool bar coupled with and extending transverse to said pull hitch, and each of said left inner, middle and outer wing sections and said right inner, middle and outer wing sections include a tool bar, with all of said tool bars being coupled together in a series arrangement across said tillage implement.

8. The agricultural tillage implement of claim 1, wherein said agricultural tillage implement is a field cultivator.

* * * * *